Patented Feb. 16, 1954

2,669,526

UNITED STATES PATENT OFFICE 2,669,526

ENAMEL COMPOSITION HAVING A STABILIZED DRYING RATE AND METHOD FOR PREPARING SAME

Donald F. Koenecke, Elizabeth, and John F. McKay, Jr., Cranford, N. J., assignors to Standard Oil Development Company, a corporation of Delaware No Drawing. Application November 30, 1949, Serial No. 130,339

4 Claims. (Cl. 106—285)

This invention relates to enamels containing synthetic drying oils as vehicles and more particularly to an improvement in stabilizing the drying properties of such enamels derived from all-hydrocarbon drying oils under storage conditions.

Synthetic drying oils can be prepared by various polymerization methods from butadiene alone or from mixtures containing butadiene together with monomers copolymerizable therewith. Sodium polymerization, aqueous emulsion polymerization as well as bulk polymerization in the presence of an organic diluent and a peroxide type catalyst have been used for this purpose with varying degrees of success. Among the difficulties encountered with such synthetic drying oils were poor drying rate, poor flexibility, poor adhesion of air-dried coatings, poor wetting properties and consequent difficulty of embodying pigments therein, poor gloss and streakiness of brushed enamel films. Some of these disadvantages have been overcome in the past by various chemical or physical modifications and as a result freshly compounded enamel compositions containing these synthetic drying oils have been found to be good replacements for enamels prepared from the best available vegetable oil containing varnishes. However, it has been noted that the drying rate of such enamel compositions gradually fell off when the compositions were aged in containers under conditions simulating shelf storage which often extends in the trade to periods of up to one year or more before the packaged product reaches the final consumer. This diminution of drying rate has now been traced to the fact that all pigments normally used in conjunction with all-hydrocarbon drying oils more or less avidly adsorb metallic soap driers initially added to the synthetic enamel compound in order to control its drying rate; and while it has been known previously in the paint and varnish industry that certain pigments had a tendency to adsorb the driers from enamels containing various vegetable drying oil varnishes, the drier adsorption seems to be of a very much different nature and far more extensive, and therefore more damaging, in the presence of synthetic drying oils, probably due to the relative inability of the synthetic drying oils properly to wet the pigments embodied therein.

In most instances these enamels when stored or aged at room temperature (24–25° C.) exhibit only a slow loss of siccative properties. If they are stored under conditions which permit temperatures to approach or exceed 50° C., the deprecia-tion proceeds at a much more rapid rate. Since many warehouses become very warm in sunny summer weather, the reduced drying rate caused by such hot storage can be problematical if not corrected. It is generally considered essential that enamels air dry to a dust free stage in 4 to 6 hours in order to be acceptable as high quality merchandise. Thus the products prepared with these hydrocarbon drying oils require a method of stabilizing the initial drying rate to insure their position as quality enamels.

In previous attempts to overcome this deficiency and thus to stabilize the drying rate of synthetic enamels, various wetting agents of the hydrocarbon sulfonate type, fatty acids as well as a variety of complex amines were tried, but found ineffective.

It has been found that the addition of calcium oxide insures a satisfactory drying rate for enamels and paints based on synthetic hydrocarbon oils.

The synthetic oils to which the present invention is applicable are oily polymers of butadiene, isoprene, dimethyl butadiene, piperylene, methyl pentadiene or other conjugated diolefins having four to six carbon atoms per molecule. Instead of polymerizing any of the aforesaid diolefins alone, they may be copolymerized in admixtures with each other or in admixtures with minor amounts of ethylenically unsaturated monomers copolymerizable therewith, e. g., with 5 to 30% of styrene, styrenes having alkyl groups substituted on the ring such as para methyl styrene, dimethyl styrene or diethyl styrene, acrylonitrile, methacrylonitrile, methyl acrylate, methyl methacrylate, vinyl isobutyl ether, methyl vinyl ketone, and isopropenyl methyl ketone. Such synthetic oils may be advantageously prepared by mass polymerization either in the presence of a hydrocarbon soluble peroxide catalyst such as benzoyl peroxide or cumene hydroperoxide, or in the presence of metallic sodium when the monomers consist of a diolefin or of a mixture of a diolefin with a styrene compound. Under proper conditions the emulsion polymerization technique may also be adapted to the preparation of drying oils to which the present invention is applicable. Suitable polymerization methods are illustrated below. Throughout the present description it will be understood that all proportions are expressed on a weight basis unless otherwise specified.

SYNTHESIS METHOD A

For example, 100 parts of butadiene-1,3, 50 parts of straight run mineral spirits boiling between 150 and 200° C. (Varsol), 3 parts of t-butyl hydroperoxide (60% pure) and 0.75 part of diisopropyl xanthogen disulfide are heated in a closed reactor at about 90° C. for 40 hours, whereupon the residual pressure is released and unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some t-butyl alcohol. This solution of polymer is then preferably fractionated to remove the dimer and usually adjusted to 50% non-volatile matter content. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U. S. patent application, Serial No. 782,850 of Arundale et al., filed on October 29, 1947, now Patent No. 2,586,594, which describes alternative monomers, catalysts, reaction diluents, polymerization modifiers, suitable ranges of proportions of the various ingredients, suitable ranges of polymerization conditions, etc.

SYNTHESIS METHOD B

An alternative polymerization method using sodium as catalyst is illustrated as follows: 80 parts of butadiene-1,3, 20 parts of styrene, 200 parts of straight run mineral spirits boiling between 150 and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or other anhydrous organic acid and filtered. Instead of neutralizing the alcohol treated product, the acid may also be added directly to the crude product containing residual metallic sodium and the latter destroyed by the acid. The colorless filtrate is then fractionally distilled to remove the alcohol and modifiers such as dioxane. Finally, additional hydrocarbon solvent is preferably distilled off until a product containing about 50%–95% non-volatile matter is obtained, the non-volatile matter being a drying oil having a molecular weight below 10,000, preferably between about 2,000 to 5,000.

Again it will be understood that the described sodium polymerization method may be varied considerably as by omitting the styrene co-reactant; or by adding the styrene only after the polymerization of butadiene monomer had begun; or dioxane may be replaced by 10 to 35 parts of another ether modifier having 3 to 8 carbon atoms such as methyl ethyl ether, dibutyl ether or phenetole; or the modifier may be omitted altogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about −15° C. and 250° C., preferably between 60 and 200° C., e. g., butane, benzene, xylene, naphtha, cyclohexane and the like. The diluents are usually used in amounts ranging from 50 to 500 parts per 100 parts of monomer. The reaction temperature may vary between about 40° C. and 100° C., preferably around 65 to 85° C. As a catalyst, 0.1 to 10 parts of dispersed metallic sodium is used per 100 parts of monomers, sodium particle sizes below 100 microns being particularly effective.

Furthermore, the present invention is also applicable to drying oils of hydrocarbon origin which have been modified by reaction with a small amount of maleic anhydride, acrylonitrile or of thioglycolic acid, the details of the modifying treatment being disclosed in co-pending applications of A. H. Gleason, Serial Nos. 102,703, filed on July 1, 1949, and 106,487, filed on July 23, 1949. It can be seen from the applications just referred to that beneficial modifications of all-hydrocarbon drying oils can be obtained by adding a small amount of a suitable polar reactant either in the step wherein the drying oil is synthesized, or in a distinct post-synthesis step. Post-synthesis treatment of all-hydrocarbon drying oils with 0.01 to 1, or preferably 0.1 to 0.5 weight percent of maleic anhydride has been found to be particularly advantageous to carry out and is illustrated immediately below.

MODIFICATION METHOD C

The finished drying oil obtained from Run B having 50% non-volatile matter content and viscosity of 0.9 poise was subjected to an after-treatment which consisted of refluxing the oil at 175° C. for 2 hours in the presence of 0.1% of maleic anhydride. The resulting oily product was perfectly clear and water-white, had approximately the same viscosity and satisfactory drying rate as the original oil, but had very much better wetting and leveling characteristics than the latter.

The mode of operation of the present invention as well as the improvement obtained thereby in formulating enamels having a stabilized drying rate is illustrated in the subsequent examples.

EXAMPLE 1

The drying rate of various enamels formulated with synthetic drying oils essentially of hydrocarbon origin were examined (a) when freshly prepared, (b) after accelerated aging in sealed containers at 60° C., and (c) after aging in sealed containers at room temperature.

The enamel used in this example consisted of:

200 g. Varsol (straight run mineral spirits, boiling range 150 to 200° C.).
200 g. butadiene-styrene copolymer oil (80/20 monomer ratio)—viscosity about 1 poise at 50% nonvolatile matter content.
200 g. titanium dioxide pigment (rutile type, enamel grind).
10 g. drier containing 10% lead and 1% manganese (as naphthenates).
5 g. drier containing 2% cobalt (as naphthenate).
10 g. calcium oxide (powder).

The copolymer was prepared by Method B and modified with about 0.2% of maleic anhydride in accordance with Method C as described earlier herein, yielding a 50% solution of copolymer oil in mineral spirits.

The enamel was prepared by adding enough copolymer solution to the titanium dioxide and calcium oxide to make a paste, whereupon the paste was ground to enamel particle size on a conventional three-roll pigment mill. Finally, the ground enamel paste was reduced with the remaining quantity of polymer solution and the indicated driers were dispersed therein. Other colored enamels were prepared in a similar manner with variations allowing for the amount of pigment required for practical hiding power.

The beneficial effect of the invention is illustrated by the data shown in the table.

initial drying with or without the stabilizing effect of the calcium oxide.

The first two examples are typical. Unstabilized sample 1-1 dries to a tack-free stage in 6 hours when fresh, but after aging 10 days at 60° C. the time has extended well beyond the desirable 6-hour range. Sample 1-2, stabilized with calcium oxide, dried almost dust-free in Table.—The effect of calcium oxide on the drier stability of hydrocarbon oil based enamels upon aging [1]

TITANIUM DIOXIDE WHITE ENAMELS

| Example | P. W. C., percent [2] | Drier No. [3] | Percent CaO [4] | Initial Drying, Hrs. | | | | Days Aged | Temp., °C | Drying, Hrs. | | | | Days Aged | Temp., °C | Drying, Hrs. | | | | Days Aged | Temp., °C | Drying, Hrs. | | | | Days Aged | Temp., °C | Drying, Hrs. | | | | Days Aged | Temp., °C | Drying, Hrs. | | | | Days Aged | Temp., °C | Drying, Hrs. | | | |
|---|---|---|---|---|---|---|---|---|---|---|---|---|---|---|---|---|---|---|---|---|---|---|---|---|---|---|---|---|---|---|---|---|---|---|---|---|---|---|---|
| | | | | 2 | 4 | 6 | 24 | | | 2 | 4 | 6 | 24 | | | 2 | 4 | 6 | 24 | | | 2 | 4 | 6 | 24 | | | 2 | 4 | 6 | 24 | | | 2 | 4 | 6 | 24 | | |
| 1-1 | 50 | 5 | 0 | 6 | 3 | 0 | 0 | 10 | 60 | 8 | 8 | 7 | 0 | 94 | 60 | 8 | 8 | 7 | 1 | 180 | 60 | 8 | 8 | 7 | 1 | 10 | 25 | 7 | 4 | 2 | 0 | 94 | 25 | 8 | 6 | 4 | 0 | 180 | 25 | 8 | 6 | 3 | 0 |
| 1-2 | 50 | 5 | 5.0 | 6 | 2 | 1 | 0 | 10 | 60 | 8 | 3 | 2 | 0 | 94 | 60 | 8 | 5 | 2 | 0 | 180 | 60 | 7 | 4 | 1 | 0 | 10 | 25 | 7 | 2 | 1 | 0 | 94 | 25 | 8 | 3 | 3 | 0 | 180 | 25 | 7 | 4 | 1 | 0 |
| 2-1 | 40 | 4 | 0 | 7 | 4 | 1 | 1 | 10 | 60 | 8 | 7 | 7 | 0 | 90 | 60 | 8 | 7 | 7 | 2 | 180 | 60 | 7 | 7 | 7 | 3 | 10 | 25 | 7 | 5 | 3 | 0 | 90 | 25 | 8 | 7 | 6 | 0 | 180 | 25 | 7 | 7 | 7 | 2 |
| 2-2 | 40 | 6 | 0 | 8 | 4 | 1 | 1 | 10 | 60 | 8 | 7 | 4 | 0 | 90 | 60 | 8 | 7 | 7 | 0 | 180 | 60 | 7 | 7 | 6 | 0 | 10 | 25 | 7 | 2 | 1 | 0 | 90 | 25 | 8 | 6 | 4 | 0 | 180 | 25 | 7 | 7 | 5 | 0 |
| 2-3 | 50 | 6 | 0 | 8 | 2 | 1 | 0 | 14 | 60 | 7 | 7 | 5 | 0 | 90 | 60 | 8 | 7 | 7 | 0 | 149 | 60 | 7 | 7 | 6 | 0 | 14 | 25 | 6 | 4 | 2 | 0 | 90 | 25 | 7 | 5 | 3 | 0 | 149 | 25 | 6 | 2 | 1 | 0 |
| 2-4 | 50 | 6 | 5.0 | 8 | 2 | 1 | 0 | 14 | 60 | 7 | 5 | 2 | 0 | 90 | 60 | 7 | 2 | 1 | 0 | 149 | 60 | 7 | 6 | 2 | 0 | 14 | 25 | 6 | 3 | 1 | 0 | 90 | 25 | 7 | 2 | 1 | 0 | 149 | 25 | 7 | 2 | 1 | 0 |
| 2-5 | 50 | 6 | 3.0 | 7 | 6 | 2 | 0 | 15 | 60 | 8 | 6 | 1 | 0 | 90 | 60 | 8 | 3 | 0 | 0 | 210 | 60 | 8 | 7 | 2 | 0 | 210 | 60 | 8 | 7 | 2 | 0 | | | | | | | | | | | | |
| 3-1 | 50 | 5 | 5.0 | 7 | 2 | 1 | 0 | 25 | 60 | 7 | 4 | 3 | 0 | 60 | 60 | 6 | 6 | 3 | 0 | 210 | 60 | 7 | 7 | 2 | 0 | 25 | 25 | 6 | 3 | 1 | 0 | 60 | 25 | 7 | 4 | 2 | 0 | 210 | 25 | 7 | 4 | 1 | 0 |
| 3-2 | 50 | 5 | (a) | 7 | 7 | 4 | 0 | 25 | 60 | 8 | 7 | 7 | 0 | 60 | 60 | 6 | 6 | 6 | 0 | 210 | 60 | 7 | 7 | 7 | 0 | 25 | 25 | 7 | 6 | 3 | 0 | 60 | 25 | 7 | 5 | 2 | 0 | 210 | 25 | 7 | 7 | 7 | 0 |
| 4-1 | 50 | 5 | 5 | 6 | 1 | 0 | 0 | 10 | 60 | 8 | 7 | 3 | 0 | 94 | 60 | 7 | 5 | 5 | 0 | 180 | 60 | 7 | 4 | 1 | 0 | 10 | 25 | 7 | 4 | 1 | 0 | 94 | 25 | 8 | 3 | 2 | 0 | 180 | 25 | 8 | 3 | 1 | 0 |
| 4-2 | 50 | 5 | (b) | 6 | 3 | 2 | 0 | 10 | 60 | 8 | 8 | 7 | 1 | 94 | 60 | 7 | 7 | 7 | 0 | 180 | 60 | 6 | 6 | 5 | 3 | 10 | 25 | 7 | 5 | 4 | 0 | 94 | 25 | 8 | 6 | 3 | 0 | 180 | 25 | 8 | 7 | 5 | 0 |
| 4-3 | 50 | 5 | (c) | 6 | 2 | 1 | 0 | 10 | 60 | 8 | 8 | 7 | 2 | 94 | 60 | 8 | 8 | 7 | 3 | 180 | 60 | 7 | 7 | 7 | 6 | 10 | 25 | 7 | 4 | 3 | 0 | 94 | 25 | 8 | 5 | 2 | 0 | 180 | 25 | 8 | 7 | 5 | 0 |
| 4-4 | 50 | 5 | (d) | 8 | 7 | 7 | 6 | 13 | 60 | 8 | 7 | 7 | 7 | 60 | 60 | 7 | 7 | 7 | 6 | 89 | 60 | 7 | 7 | 7 | 6 | 13 | 25 | 8 | 7 | 7 | 5 | 60 | 25 | 7 | 7 | 7 | 6 | 89 | 25 | 7 | 7 | 7 | 6 |
| 4-5 | 50 | 5 | (e) | 7 | 7 | 7 | 0 | 11 | 60 | 8 | 7 | 7 | 0 | 33 | 60 | 8 | 7 | 6 | 0 | | | | | | | 11 | 25 | 7 | 7 | 3 | 0 | 33 | 25 | 7 | 3 | 1 | 0 | | | | | | |

CHROME YELLOW ENAMELS

| 5-1 | 50 | 5 | 5.0 | 6 | 2 | 0 | 0 | 10 | 60 | 8 | 3 | 1 | 0 | 94 | 60 | 8 | 3 | 2 | 0 | 180 | 60 | 7 | 2 | 0 | 0 | 10 | 25 | 6 | 2 | 1 | 0 | 94 | 25 | 8 | 2 | 1 | 0 | 180 | 25 | 8 | 2 | 1 | 0 |
| 5-2 | 50 | 5 | 0 | 8 | 4 | 3 | 0 | 14 | 60 | 8 | 7 | 5 | 0 | 60 | 60 | 7 | 7 | 6 | 0 | 90 | 60 | 8 | 7 | 7 | 1 | 14 | 25 | 7 | 3 | 2 | 0 | 60 | 25 | 8 | 6 | 3 | 0 | 90 | 25 | 7 | 5 | 3 | 0 |
| 5-3 | 50 | 5 | 3.0 | 8 | 3 | 2 | 0 | 14 | 60 | 7 | 3 | 2 | 0 | 60 | 60 | 7 | 6 | 3 | 1 | 90 | 60 | 8 | 7 | 7 | 1 | 14 | 25 | 6 | 1 | 1 | 0 | 60 | 25 | 6 | 3 | 2 | 0 | 90 | 25 | 8 | 4 | 2 | 0 |
| 5-4 | 50 | 5 | 1.5 | 8 | 4 | 2 | 0 | 14 | 60 | 7 | 5 | 4 | 0 | 60 | 60 | 7 | 5 | 4 | 0 | 90 | 60 | 7 | 6 | 5 | 1 | 14 | 25 | 6 | 2 | 1 | 0 | 60 | 25 | 7 | 3 | 2 | 0 | 90 | 25 | 7 | 5 | 4 | 0 |
| 5-5 | 50 | 5 | 0.75 | 8 | 4 | 2 | 0 | 14 | 60 | 7 | 5 | 3 | 0 | 60 | 60 | 7 | 6 | 5 | 0 | 90 | 60 | 7 | 6 | 5 | 1 | 14 | 25 | 7 | 3 | 2 | 0 | 60 | 25 | 6 | 3 | 2 | 0 | 90 | 25 | 7 | 5 | 4 | 0 |

CHROME GREEN ENAMELS

| 6-1 | 31 | 6 | 0 | 7 | 6 | 5 | 0 | 3 | 60 | 7 | 7 | 6 | 2 | 25 | 60 | 8 | 7 | 7 | 1 | | | | | | | | | | | | | | | | | | | | | | | | |
| 6-2 | 25 | 5 | 3 | 8 | 6 | 2 | 0 | 11 | 60 | 7 | 7 | 5 | 0 | 90 | 60 | 7 | 7 | 3 | 0 | 124 | 60 | 8 | 7 | 5 | 0 | 11 | 25 | 7 | 5 | 2 | 0 | 90 | 25 | 7 | 6 | 2 | 0 | 124 | 25 | 8 | 8 | 3 | 0 |

[1] Code for drying rate determination is 9—wet, 8—very sticky, 7—film just clings to a finger, 6—set-to-touch, 3—decided tack but dust-free, 0—tack-free.
[2] P. W. C.—pigment weight concentration in percent based on the total non-volatile material.
[3] Drier number—4 is 0.4% lead, 0.04% manganese, and 0.04% cobalt in terms of the metal in the form of the naphthenate soap based on the siccative polymer present; 5 is 0.5% lead, 0.05% manganese, 0.05% cobalt; 6 is 0.6% lead, 0.06% manganese and 0.06% cobalt.
[4] Percent calcium oxide is based on the amount of siccative polymer present.
a 0.5% calcium in the form of naphthenate instead of calcium oxide.
b 7.25% zinc oxide replacing calcium oxide.
c 3.6% magnesium oxide replacing the calcium oxide.
d 5.0% calcium hydroxide replacing calcium oxide.
e 15% barium oxide replacing approximately 5% calcium oxide.

It has been found that the addition of calcium oxide insures a satisfactory drying rate for enamels and paints based on synthetic hydrocarbon oils. Without this stabilizing action it could not be recommended as a quality product after storage for comparatively short time intervals under conditions not necessarily abnormal.

In most examples there are calcium oxide-free controls representative of the prior art as well as samples stabilized with calcium oxide following the mode of the invention. After aging as little as 10-14 days or up to 210 days the control samples did not dry to a dust-free stage in 6 hours. On the other hand those samples which were stabilized with calcium oxide maintained their satisfactory drying rate and became dust free in 6 hours or less. Some samples show slight depreciation of the drying rate even in the presence of calcium oxide but they still maintain the necessary level. There are indications of a slow loss in drying rate even at room temperature storage without the aid of the invention but the degree is not as harmful. Of course, the initial drier concentration must be sufficient to promote 4 hours and nearly tack-free in 6 hours, after having been stored in closed containers for 180 days at 60° C. Samples 3-2, 4-2, 4-3, 4-4 and 4-5 containing calcium naphthenate, zinc oxide, magnesium oxide, calcium hydroxide, and barium oxide, respectively, demonstrate the relatively poor efficiency of these compounds as stabilizers under the condition of the invention. The chrome yellow enamels are illustrative of the effect of varying amounts of calcium oxide. It is apparent that the most effective concentration is between about 2.5 and 10, preferably between 3 and 5% calcium oxide based on the siccative polymer present in the enamel.

It can be seen from the foregoing that calcium oxide has been found to be a surprisingly effective and unique material capable of stabilizing the drying rate of drier-containing enamels based on a synthetic varnish essentially hydrocarbonaceous in nature. And while the invention has been demonstrated in conjunction with enamels containing an almost completely oxygen-free varnish prepared by sodium polymerization of all-hydrocarbon monomers and which therefore represents the type of synthetic varnish most apt to lose its drying rate, it must be understood that a similarly beneficial result can be obtained with enamels characterized by a somewhat more pronounced polar character, though the need for drier stabilization gradually diminishes as the polar nature of the enamel base becomes more pronounced.

It must also be understood that while the invention has been demonstrated herein only in conjunction with only a few typical pigments, it is substantially as effective with other pigments such as toluidine red, Lithol red, iron and phthalocyanine blues, hansa yellow, red lead, carbon black and the like. Depending on the type of pigment employed and eventual use contemplated, the concentration of pigment may be varied in various enamels within very broad ranges such as between 5 and 75% based on the weight of non-volatile polymeric constituents of the varnish base. For example, carbon black is usually used in concentrations ranging from 6 to 10%, titanium dioxide 35 to 70%, and lead pigments in even higher weight concentrations. Moreover, in preparing the initial paste, concentrations as high as 300 parts of pigment per 100 parts of varnish base are not uncommon.

Also whereas the invention has been described herein in conjunction with certain specific, conventional drier formulas, other known driers may be used likewise, individually or in admixture with each other in the form of oil-soluble organic acid soaps of heavy metals. Suitable driers include heavy metal soaps of octanoic acid, stearic or oleic acid, e. g. copper octoate, cobalt stearate or manganese oleate.

Furthermore, the novel compositions may be extended or mixed with suitable hydrocarbon solvents such as xylene, various naphthas, mixed aromatics in the benzene and xylene range, white oils and so on. Finally, though modification is normally unnecessary, the novel paint or enamel compositions may be modified further by mixing therewith other natural or synthetic drying oils, e. g. linseed oil, or natural and synthetic resins, e. g. rosin or ester gum.

From the foregoing description and the several illustrative examples, it will be apparent that numerous other embodiments and modifications fall within the scope and spirit of the present invention.

The claimed invention is defined as follows:

1. A coating composition comprising 100 parts of an oily siccative diolefin polymer prepared by the polymerization of conjugated diolefins having from 4 to 6 carbon atoms in the presence of a catalyst chosen from the class consisting of hydrocarbon soluble peroxides and metallic sodium having a molecular weight between 1,000 and 10,000 in solution in a hydrocarbon solvent boiling between about 60 and 250° C., 5 to 300 parts of a finely divided pigment dispersed therein, a small amount of at least one heavy metal soap drier, and about 2.5 to 10 percent of powdered calcium oxide based on the weight of diolefin polymer.

2. An enamel composition comprising 100 parts of an oily copolymer of 60 to 90 percent of butadiene and 40 to 10 percent of styrene prepared by heating the monomers in an inert hydrocarbon diluent at a temperature between 40° C. and 100° C. in the presence of a dispersed metallic sodium catalyst, said oily copolymer having a molecular weight between 2,000 and 5,000; 25 to 200 parts of a hydrocarbon solvent boiling between about 60 and 250° C.; 5 to 75 parts of a finely powdered pigment; 0.05 to 1.0 part of a drier consisting of an organic soap of a heavy metal; and 3 to 5 parts of finely powdered calcium oxide.

3. An enamel composition comprising 100 parts of an oily copolymer of 75 to 85 percent of butadiene, 25 to 15 percent of styrene and 0.01 to 1.0 percent of maleic anhydride, prepared by heating the hydrocarbon monomers at a temperature between 40 and 100° C. in an inert hydrocarbon diluent boiling between 60 and 250° C. in the presence of a dispersed metallic sodium catalyst and by subsequently heating the resulting oily copolymer with 0.01 to 1% of maleic anhydride based on the copolymer, the copolymer having an intrinsic viscosity between 0.15 and 0.30; 60 to 150 parts of an essentially aliphatic hydrocarbon boiling between about 150 and 200° C.; 40 to 60 parts of titanium dioxide; 0.05 to 1.0 part of a metal soap drier chosen from the group consisting of napthenates of lead, manganese and cobalt; and 3 to 5 parts of finely powdered calcium oxide.

4. In the process of making up an enamel composition comprising 100 parts of an oily sodium copolymer of 60 to 90 percent of butadiene and 40 to 10 percent of styrene and having a molecular weight between 2,000 and 5,000, 60 to 150 parts of an essentially aliphatic hydrocarbon boiling between 60 and 250° C., 40 to 75 parts of a finely powdered pigment and 0.05 to 1.0 part of a heavy metal soap drier, the step of adding to the enamel composition 3 to 5 parts of finely powdered calcium oxide substantially at the same time when the said pigment is added thereto.

DONALD F. KOENECKE.
JOHN F. McKAY, Jr.

References Cited in the file of this patent

UNITED STATES PATENTS

| Number | Name | Date |
|---|---|---|
| 2,188,882 | Clocker | Jan. 30, 1940 |
| 2,252,333 | Rothrock | Aug. 12, 1941 |
| 2,494,565 | Lewis et al. | Jan. 17, 1950 |
| 2,529,322 | Zimmer et al. | Nov. 7, 1950 |

OTHER REFERENCES

"Uses and Applications of Chemicals and Related Materials," Gregory, vol. I, Reinhold Publ. Co., New York, 1939, page 141.

"Paint and Varnish Technology" von Fischer, Reinhold Publ. Co., New York, 1948, page 273.